(12) United States Patent
Bhagwan et al.

(10) Patent No.: US 9,280,441 B2
(45) Date of Patent: Mar. 8, 2016

(54) DETECTION AND CORRECTION OF RACE CONDITIONS IN WORKFLOWS

(71) Applicant: International Business Machines Corporation, Armonk, NY (US)

(72) Inventors: Varun Bhagwan, San Jose, CA (US); Daniel F. Gruhl, San Jose, CA (US); John T. E. Timm, San Jose, CA (US); April L. Webster, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 469 days.

(21) Appl. No.: 13/909,354

(22) Filed: Jun. 4, 2013

(65) Prior Publication Data

US 2014/0359625 A1  Dec. 4, 2014

(51) Int. Cl.
*G06F 9/45* (2006.01)
*G06F 9/46* (2006.01)
*G06F 11/36* (2006.01)

(52) U.S. Cl.
CPC ........ *G06F 11/36* (2013.01); *G06F 8/40* (2013.01); *G06F 8/433* (2013.01); *G06F 11/3632* (2013.01)

(58) Field of Classification Search
None
See application file for complete search history.

(56) References Cited

U.S. PATENT DOCUMENTS

| | | | |
|---|---|---|---|
| 6,343,371 B1 * | 1/2002 | Flanagan | G06F 9/526 700/17 |
| 7,673,295 B1 | 3/2010 | Lin | |
| 7,685,572 B1 | 3/2010 | Qiao | |
| 2005/0091646 A1 | 4/2005 | Chilimbi et al. | |
| 2013/0152090 A1 * | 6/2013 | Balko | G06F 9/52 718/102 |

OTHER PUBLICATIONS

Disclosed Anonymously; "Test for Race Conditions"; IP.com PriorArt Database Technical Disclosure; IPCOM000206912D; Publication May 13, 2011; <http://priorartdatabase.com/IPCOM/0002506912>.

Y. Yu et al.; "RaceTrack: Efficient Detection of Data Race Conditions via Adaptive Tracking"; SOSP '05; Oct. 23-26, 2005; Brighton, United Kingdom; Copyright 2005.

IBM; "Using data alignment to exhibit race conditions"; IP.com PriorArt Database Technical Disclosure; Publication IPCOM000191273D; Dec. 24, 2009; <http://www.ip.com/pubview/IPCOM000191273D>.

(Continued)

*Primary Examiner* — Jason Mitchell
*Assistant Examiner* — Mark Gooray
(74) *Attorney, Agent, or Firm* — Steven L. Fisher-Stawinski

(57) ABSTRACT

A race condition in a workflow representation is detected and corrected. First and second contracts are retrieved for respective first and second analytics of the workflow representation, wherein the contracts specify input types and output types of their analytics. Both contracts include information required to execute their respective analytics by a workflow executor. It is determined that the output type of the first analytic matches the input type of the second analytic based on a comparison of the first contract and the second contract, and that the workflow representation does not include a directed edge connecting the first analytic to the second analytic. The inclusion of a directed edge in the workflow representation connecting the first analytic to the second analytic will correct the race condition in the workflow representation.

20 Claims, 5 Drawing Sheets

(56) References Cited

OTHER PUBLICATIONS

Lei, et al.; "UML Activity Diagram Based Testing of Java Concurrent Programs for Data Race and Inconsistency"; 2008 International Conference on Software Testing, Verification, and Validation; IEEE Computer Society; pp. 200-209; Copyrigth 2008 IEEE.

Vitolins et al.; "Semantics of UML 2.0 Activity Diagram for Business Modeling by Means of Virtual Machine".

Linzhang Wang; "Model-based Gray-Box Testing: From Art to Engineering"; Nanjing University—Department of Computer Science and Technology; Sep. 24, 2011.

* cited by examiner

DETECTION AND CORRECTION OF RACE CONDITIONS IN WORKFLOWS

BACKGROUND

The present invention relates generally to the analysis of race conditions, and more specifically to the design-time analysis of workflows to detect and correct race conditions.

Complex, modular, and distributed large-scale workflow systems are emerging as a methodology to allow actionable insights to be extracted from the plethora of information now flowing to decision makers. Workflow systems have various techniques for representing workflows. For example, one commonly-used workflow representation is a Unified Modeling Language ("UML") activity diagram. Workflow systems can include, for example, analytics systems and business process systems. As the complexity and size of a workflow representation increases, the opportunities for difficult to debug logic errors to arise increase rapidly.

One challenging logic error to debug is a race condition. A race condition occurs when different executions of a workflow representation produce different results depending on the order of component execution, i.e., when the order is logically "under-restricted." Because these logic errors are nondeterministic, they are hard to replicate, and thus are extremely hard to debug at run-time. In one example, in an analytics system's workflow representation in which one consumer analytic node is designed to receive input from two producer analytic nodes, if the workflow representation is under-restricted, then the output of the consumer analytic node may depend on the order of execution of the two producer analytic nodes, with respect to each other or with respect to the consumer analytic node. In another example, in a business process system's workflow representation in which multiple purchase approval nodes provide input to a purchase order node, if the workflow representation is under-restricted, then the purchase order node output may be similarly unpredictable.

SUMMARY

Embodiments of the present invention relate to detecting and correcting a race condition in a workflow representation. First and second contracts are retrieved for respective first and second analytics of the workflow representation, wherein the contracts specify input types and output types of their analytics. Both contracts include information required to execute their respective analytics by a workflow executor. It is determined that the output type of the first analytic matches the input type of the second analytic based on a comparison of the first contract and the second contract, and that the workflow representation does not include a directed edge connecting the first analytic to the second analytic. The inclusion of a directed edge in the workflow representation connecting the first analytic to the second analytic will correct the race condition in the workflow representation.

DETAILED DESCRIPTION

Figure 1:
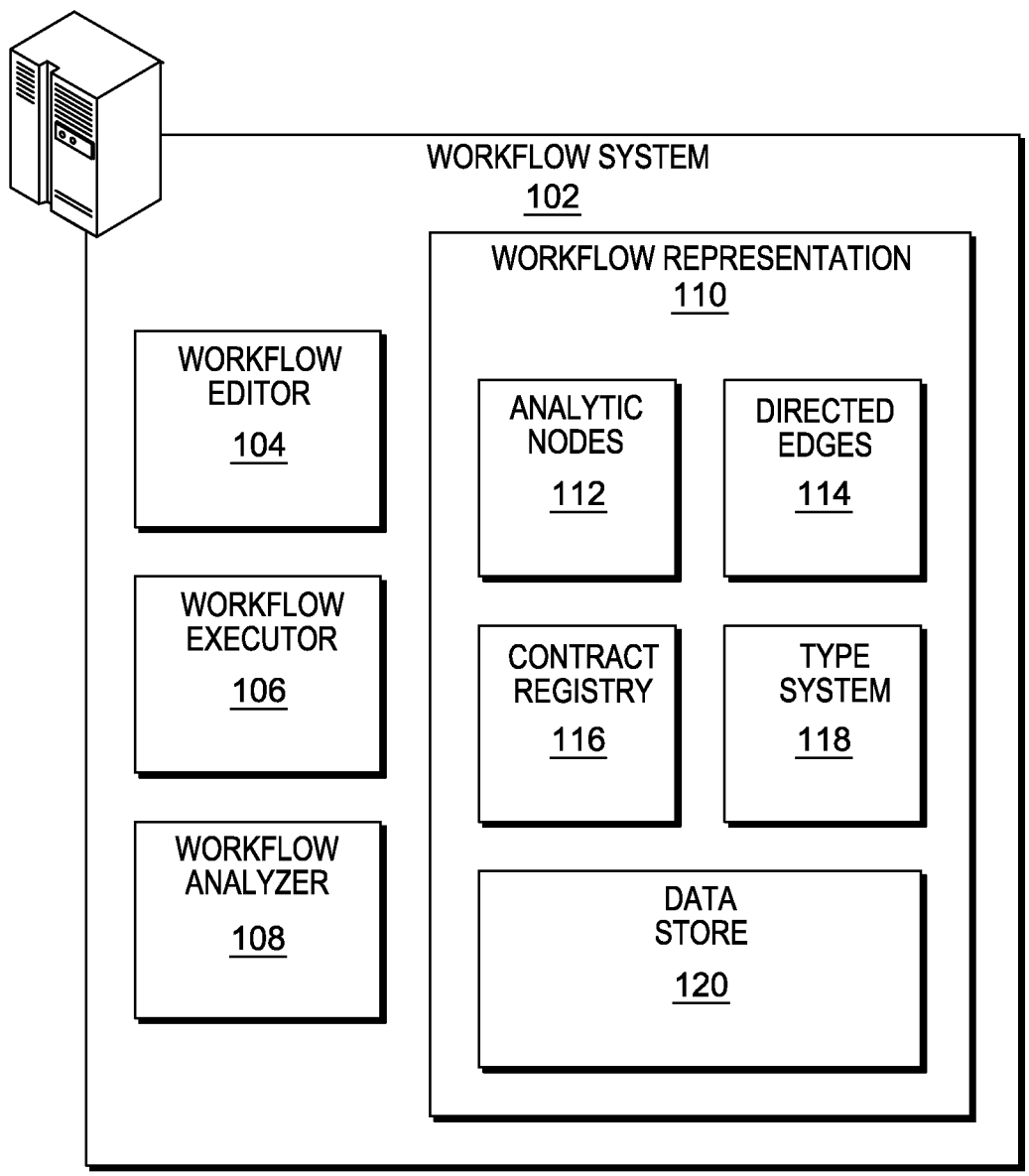
FIG. 1 is a block diagram of a workflow system in accordance with an embodiment of the present invention.

Referring now to FIG. 1, a block diagram of workflow system 102 in accordance with an embodiment of the present invention is shown. Workflow system 102 can include a laptop, tablet, or netbook personal computer, a desktop computer, a personal digital assistant, a smart phone, a mainframe computer, or a networked server computer. Further, workflow system 102 can include computing systems utilizing clustered computers and components to act as single pools of seamless resources when accessed through a network, or can represent one or more cloud computing datacenters. In general, workflow system 102 can be any programmable electronic device as described in further detail below with respect to FIG. 5. Workflow system 102 can communicate over a network (not shown), which can be, for example, a local area network (LAN), a wide area network (WAN) such as the Internet, or a combination of the two, and can include wired or wireless connections. In general, the network can be any combination of connections and protocols that will support communications between workflow system 102 and remote systems. As will be discussed in detail below, workflow system 102 can perform a design-time analysis to detect and assist in the correction of race conditions in workflow representations.

Workflow system 102 includes workflow editor 104, workflow executor 106, workflow analyzer 108, and workflow representation 110. Workflow representation 110 is a representation of a workflow that has been created for any purpose. For example, workflow representation 110 may have been created to model a business process, or to perform analytics on data. In the following discussion of FIG. 1, workflow representation 110 and operations performed on it by workflow editor 104, workflow executor 106, and workflow analyzer 108 will be described. In the subsequent discussion of FIGS. 2A, 2B, and 3, alternate depictions of workflow representation 110 will be described.

Workflow representation 110 includes analytics nodes 112, directed edges 114, contract registry 116, type system 118, data store 120, and other workflow information. Each analytic node in analytics nodes 112 includes code (i.e., includes an analytic) that examines and/or transforms input data, typically producing additional data and/or meta-data as output. Both the input an analytic utilizes and the output it produces can be described in terms of the "types" of data each can contain. A type is a declaration of a conceptual abstraction of a domain concept (e.g., in the context of a healthcare domain, a type can include a blood pressure type, etc.). Each type belongs to type system 118, which includes a grouping of related types. Each unit of data (i.e., each token or object, etc.) in data store 120 is typed in accordance with a type in type system 118. An analytic's input and output types (which may be referred to as its functional requirements, in a broader sense) are formally specified in the analytic's contract, stored in contract registry 116. For example, a contract can be registered in contract registry 116 as an XML document that contains type information, as well as additional contextual or run-time processing information required to execute the analytic by workflow executor 106.

In one embodiment, workflow representation 110 is a Unified Modeling Language ("UML") activity diagram. Generally, a UML activity diagram can include initial nodes representing the beginning of a workflow, opaque actions representing abstract units of computation (e.g., an analytic, etc.), a control flow representing the flow of control from one unit of computation to the next, typed input/output pins (i.e., "I/O pin") representing points at which each unit of computation produces or consumes typed data, a data flow representing the flow of data from one unit of computation to the next, and final nodes representing the end of the workflow. In other embodiments, workflow representation 110 can be implemented as any kind of representation, such as a business process representation, and is not limited to being implemented as a UML activity diagram.

Workflow editor 104 is a design-time program that can be used, for example by a human user or programmatic user of workflow system 102, to create, edit, or delete workflow representation 110. In the context of a human user, workflow editor 104 can provide an editable depiction of workflow representation 110 on a user interface of workflow system 102. In one embodiment, workflow editor 104 can create multiple, different instances of workflow representation 110 within workflow system 102. Further, workflow editor 104 can add or remove one or more of each of analytics nodes 112 and directed edges 114 to or from workflow representation 110. In one embodiment, each of directed edges 114 must connect two I/O pins having the same type in type system 118, and connections between dissimilarly-typed I/O pins are prohibited by workflow editor 104. Generally, in various embodiments, each of directed edges 114 can represent a portion of the data flow, a portion of the control flow, a portion of both, or neither (i.e., in the latter case, a given directed edge might not categorically belong to either the data flow or the control flow). After creation or editing, workflow representation 110 may include a race condition, for example because it is logically under-restricted. Notably, such a race condition can exist, even though all contracts of the analytics in workflow representation 110 have been adhered to. As will be discussed below, workflow analyzer 108 can perform a design-time analysis to detect and assist in the correction of such a race condition.

Workflow executor 106 is a run-time program that can execute workflow representation 110 after creation or editing. Workflow executor 106 can prime one or more initial nodes of analytic nodes 112 with data from data store 120, and then execute workflow representation 110 by executing each of analytic nodes 112 in a serialized order that is constrained by directed edges 114. In one embodiment, if two given nodes of analytic nodes 112 are serialized to execute in an order constrained by their connecting directed edge, then the first node will complete execution and store its produced output in data store 120 before the second node begins execution and receives input from data store 120. Generally, during execution of each one of analytic nodes 112, the respective node receives typed data from data store 120 at its input pins, performs a computation on the data, and produces typed data at its output pins. In one embodiment, during execution of a given analytic node, a typed input pin of the given analytic node receives all matching-typed data in data store 120 that has been produced by previously executed analytic nodes 112.

Workflow analyzer 108 is a design-time program that can be used, for example by a human user or programmatic user of workflow system 102, to perform a design-time analysis of workflow representation 110 to detect and assist in the correction of race conditions. A user of workflow system 102 can invoke workflow analyzer 108 at any time. For example, if the user observes two different results after two respective executions of workflow representation 110, then given all other things being equal, the user may conclude that a race condition that needs correcting is present in workflow representation 110, and may then invoke workflow analyzer 108. In various embodiments, workflow analyzer 108 can be invoked on workflow representation 110 prior to any execution of workflow representation 110, invoked periodically, or invoked after each edit of workflow representation 110 by workflow editor 104, for example. In the context of a human user, workflow analyzer 108 can depict recommended corrections to workflow representation 110 on the editable depiction of workflow editor 104 on a user interface of workflow system 102. However, in various embodiments, a correction can be made by workflow analyzer 108 automatically.

Figure 2A:
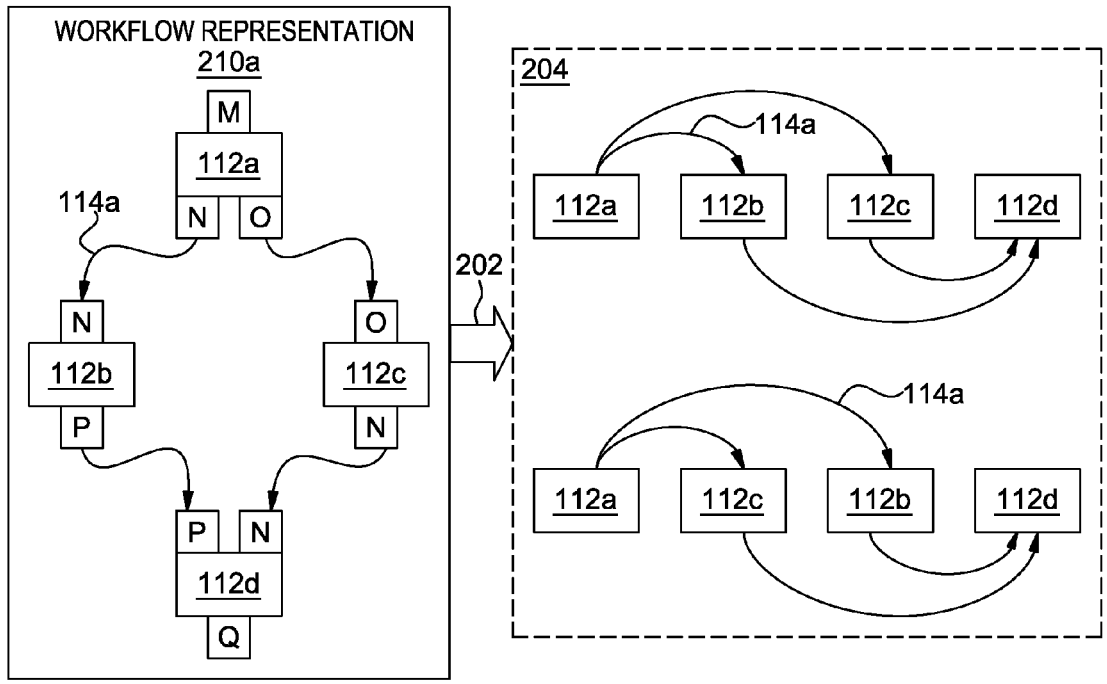
FIGS. 2A and 2B are block diagrams of workflow representations of the workflow system of FIG. 1, as well as corresponding serialized orders, in accordance with an embodiment of the present invention.
Figure 2B:
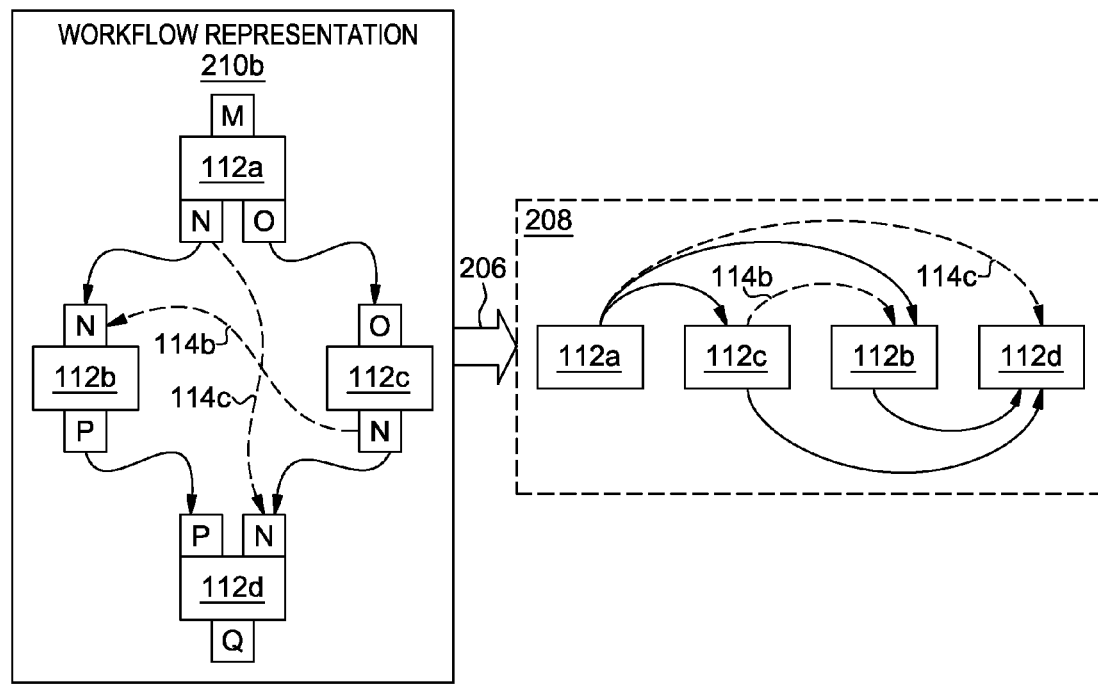

FIGS. 2A and 2B are block diagrams of workflow representations 210a and 210b of workflow system 102, as well as corresponding serialized orders 204 and 208, in accordance with an embodiment of the present invention. Workflow representations 210a and 210b are alternate depictions of workflow representation 110 before and after, respectively, performance by workflow analyzer 108 of a design-time analysis to detect and assist in the correction of race conditions.

Referring now to FIG. 2A, workflow representation 210a depicts analytic nodes 112a, 112b, 112c, and 112d of analytics nodes 112. Analytic node 112a is depicted as having three I/O pins, one of which inputs type-M data, and two which output data having types N and O. Analytic nodes 112b, 112c, and 112d have a variety of additional I/O pins, as depicted. Workflow representation 210a also depicts several of directed edges 114, i.e., depicts directed edge 114a and additional unlabeled directed edges. Each of directed edges 114 connects I/O pins having the same type in type system 118. For example, the type-O output pin of analytic node 112a is connected to the type-O input pin of analytic node 112c.

Workflow representation 210a can be serialized and executed by workflow executor 106. In particular, workflow executor 106 can serialize workflow representation 210a by determining serialized orders 204 in which to execute all of analytic nodes 112, as constrained by directed edges 114. In one embodiment, workflow executor 106 can determine serialized orders 204 by performing topological sort 202 on a directed graph comprised of analytic nodes 112 and directed edges 114. Notably, workflow representation 210a has at least two valid serialized orders depicted in serialized orders 204, which are 112a, 112b, 112c, 112d and 112a, 112c, 112b, 112d. Only one of the two depicted valid serialized orders is determined by workflow executor 106 prior to a given execution of workflow representation 210a.

In a first embodiment, the determination during topological sort 202 of one or the other of the two valid serialized orders depicted in serialized orders 204 is nondeterministic, such that only one of the two valid serialized order is produced per execution of workflow representation 210a. This nondeterministic serialization is regarded as a first type of race condition. In a second embodiment, the determination by topological sort 202 of one or the other of the two valid serialized orders depicted in serialized orders 204 is deterministic, such that only one of the two valid serialized orders is produced in any execution of workflow representation 210a. However, if this second embodiment does not include a constraint, e.g. as stated above, that during serialized execution a first node must complete execution and store its produced output in data store 120 before a second node begins execution and receives input from data store 120, then an aspect of nondeterminism still exists; this nondeterministic execution is regarded as a second type of race condition. According to the technique introduced herein, workflow analyzer 108 can detect and assist in the correction of both types of race conditions.

Accordingly, regardless of which one of the two depicted valid serialized orders is determined by workflow executor 106 prior to a given execution, a race condition can exist in workflow representation 210a. The race condition can be evidenced by, for example, different executions of workflow representation 210a producing different results at, e.g., the output pin of analytic node 112d. Upon observing this evidence, a user of workflow system 102 can invoke workflow analyzer 108.

Referring now to FIG. 2B, workflow representation 210b depicts workflow representation 110 after performance by workflow analyzer 108 of a design-time analysis to detect and assist in the correction of race conditions. In particular, workflow representation 210b depicts analytic nodes 112a, 112b, 112c, and 112d, as well as directed edge 114a, new directed edges 114b and 114c, and additional unlabeled directed edges. Notably, the design-time analysis of workflow analyzer 108 has yielded a recommendation to add new directed edges 114b and 114c, in order to eliminate the race condition described in detail in the context of FIG. 2A.

To perform a design-time analysis, workflow analyzer 108 retrieves the contract for each analytic of analytic nodes 112 in workflow representation 210b from contract registry 116. Based on the contract for each analytic, which describes the input and output types of the analytic, workflow analyzer 108 determines the possibility of a race condition by checking to see if one of directed edges 114 exists from all output pins of a specific type to all input pins of the same type. In one embodiment, workflow analyzer 108 makes this determination in the context of all of analytic nodes 112 in a given workflow representation. However, in another embodiment, workflow analyzer 108 makes this determination in the context of less than all of analytic nodes 112 in a given workflow representation, such that for a given output pin, only those of analytic nodes 112 that are downstream from the given output pin in terms of one or both of control flow or data flow are relevant to the determination. Stated another way, in various embodiments, the scope of the design-time analysis performed by workflow analyzer 108 can vary according to the reachability, in one or both of a control flow or data flow sense, of analytic nodes 112. If workflow analyzer 108 finds that a directed edge is missing between I/O pins of the same type, workflow analyzer 108 recommends a correction in the form of a new directed edge.

Accordingly, workflow representation 210b depicts new directed edges 114b and 114c as recommended by workflow analyzer 108. In particular, workflow analyzer 108 recommends new directed edge 114b, because in the absence of new directed edge 114b, the type-N output pin of analytic node 112c is not connected to the type-N input pin of analytic node 112b. Further, workflow analyzer 108 recommends new directed edge 114c, because in the absence of new directed edge 114c, the type-N output pin of analytic node 112a is not connected to the type-N input pin of analytic node 112d.

After being corrected by the addition of new directed edges 114b and 114c, workflow representation 210b can be serialized and executed by workflow executor 106. In particular, workflow executor 106 can serialize workflow representation 210b by determining serialized order 208 in which to execute all of analytic nodes 112, as constrained by directed edges 114, by performing topological sort 206. Notably, workflow representation 210b has only one valid serialized order depicted in serialized order 208, which is 112a, 112c, 112b, 112d. As such, the alternative order depicted in serialized order 204 of FIG. 2A is no longer valid. Accordingly, nondeterministic serialization yielding the first type of race condition discussed above is no longer possible in the context of workflow representation 210b. Additionally, nondeterministic execution yielding the second type of race condition discussed above is also no longer possible in the context of workflow representation 210b. As such, workflow analyzer 108 has detected corrected both types of race conditions, according to the technique introduced herein.

Figure 3:
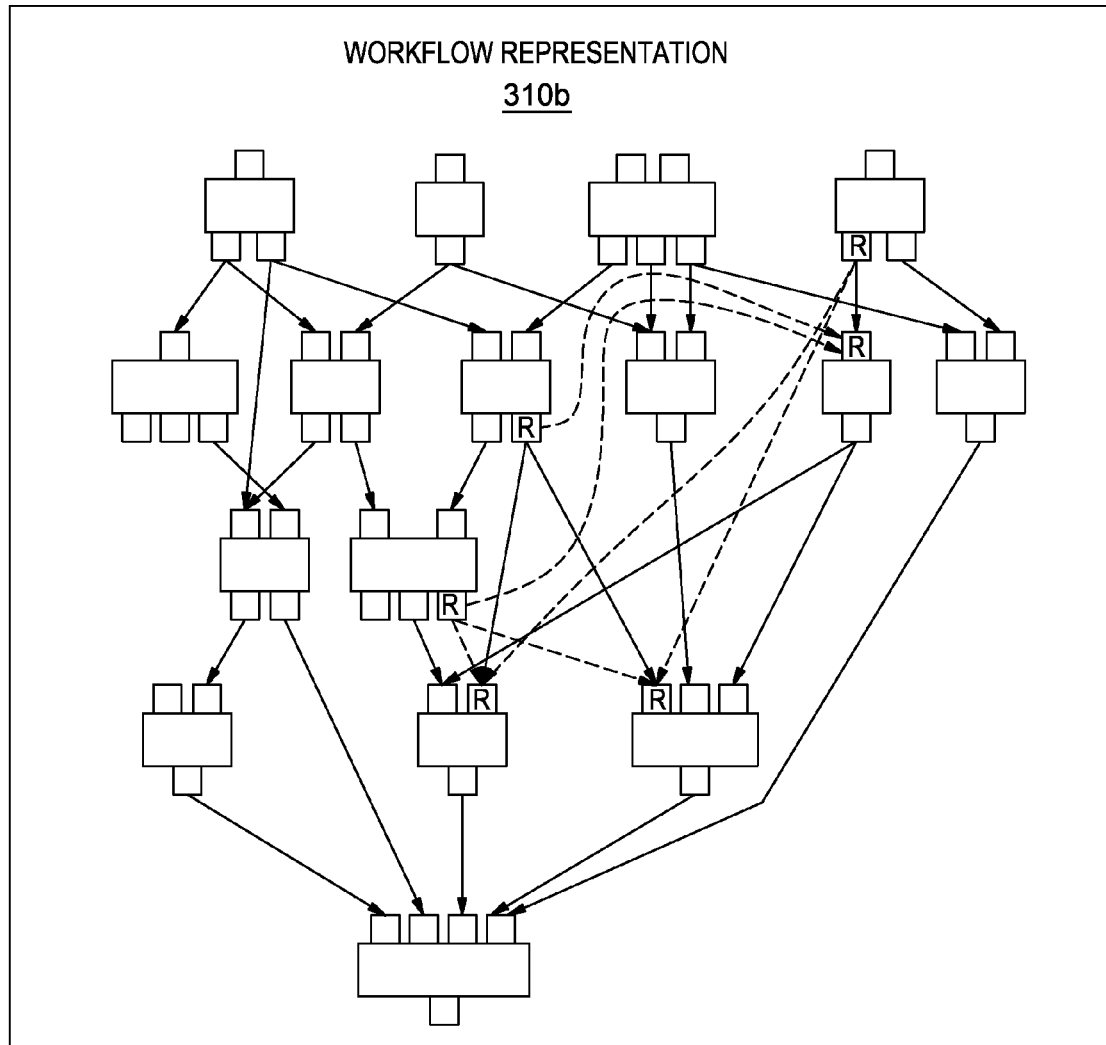
FIG. 3 is a block diagram of a workflow representation of the workflow system of FIG. 1 in accordance with an embodiment of the present invention.

Referring now to FIG. 3, a block diagram of workflow representation 310b of workflow system 102 in accordance with an embodiment of the present invention is shown. Workflow representation 310b depicts a workflow of greater size and complexity than workflows 210a or 210b, and as such can be a different instance of workflow representation 110. Workflow representation 310b has undergone a design-time analysis by workflow analyzer 108 to detect and assist in the correction of race conditions. Accordingly, new directed edges, shown as dashed lines, have been added to connect the type-R I/O pins of workflow representation 310b. Generally, FIG. 3 illustrates the fact that in workflows of significant size and complexity, numerous corrections can be made that would evade ordinary detection by a human user working with an editable depiction on a user interface of workflow system 102.

Figure 4:
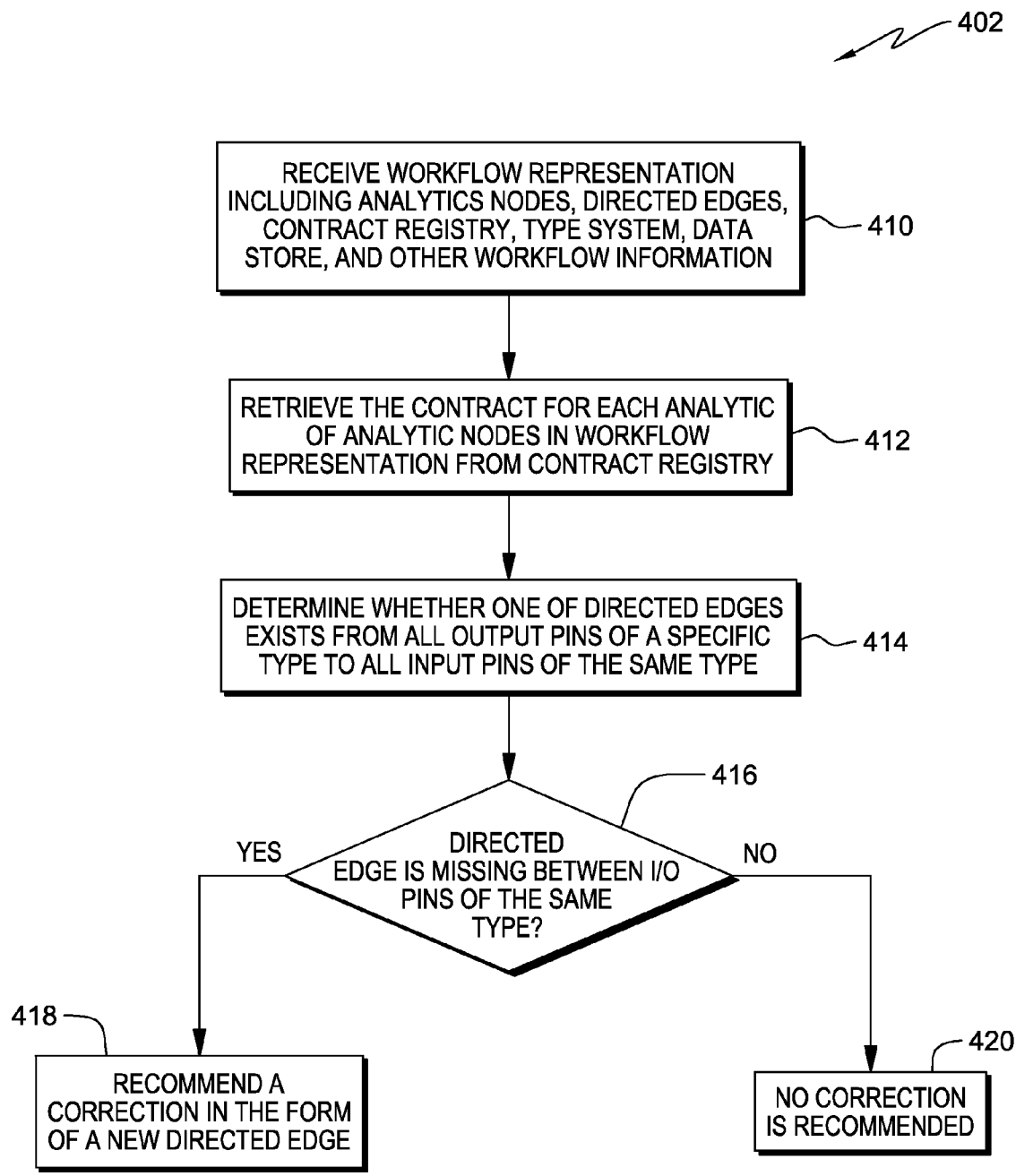
FIG. 4 is a flowchart depicting steps followed by a workflow analyzer of the workflow system of FIG. 1 during performance of a design-time analysis to detect and assist in the correction of race conditions in a workflow representation in accordance with an embodiment of the present invention.

Referring now to FIG. 4, flowchart 402 depicts steps followed by workflow analyzer 108 of workflow system 102 of FIG. 1 during performance of a design-time analysis to detect and assist in the correction of race conditions in workflow representation 110 in accordance with an embodiment of the present invention. In step 410, workflow analyzer 108 receives workflow representation 110 including analytics nodes 112, directed edges 114, contract registry 116, type system 118, data store 120, and other workflow information. In step 412, workflow analyzer 108 retrieves the contract for each analytic of analytic nodes 112 in workflow representation 110 from contract registry 116. In step 414, workflow analyzer 108 determines the possibility of a race condition by checking to see if one of directed edges 114 exists from all output pins of a specific type to all input pins of the same type. If workflow analyzer 108 finds that a directed edge is missing between I/O pins of the same type in step 416, then in step 418 workflow analyzer 108 recommends a correction in the form of a new directed edge (e.g., recommends new directed edges 114b and 114c depicted in FIG. 2B, etc.). In one embodiment, in step 418 workflow analyzer 108 automatically performs the correction by including a new directed edge. If workflow analyzer 108 does not find that a directed edge is missing between I/O pins of the same type in step 416, then in step 420 workflow analyzer 108 does not recommend a correction.

Figure 5:
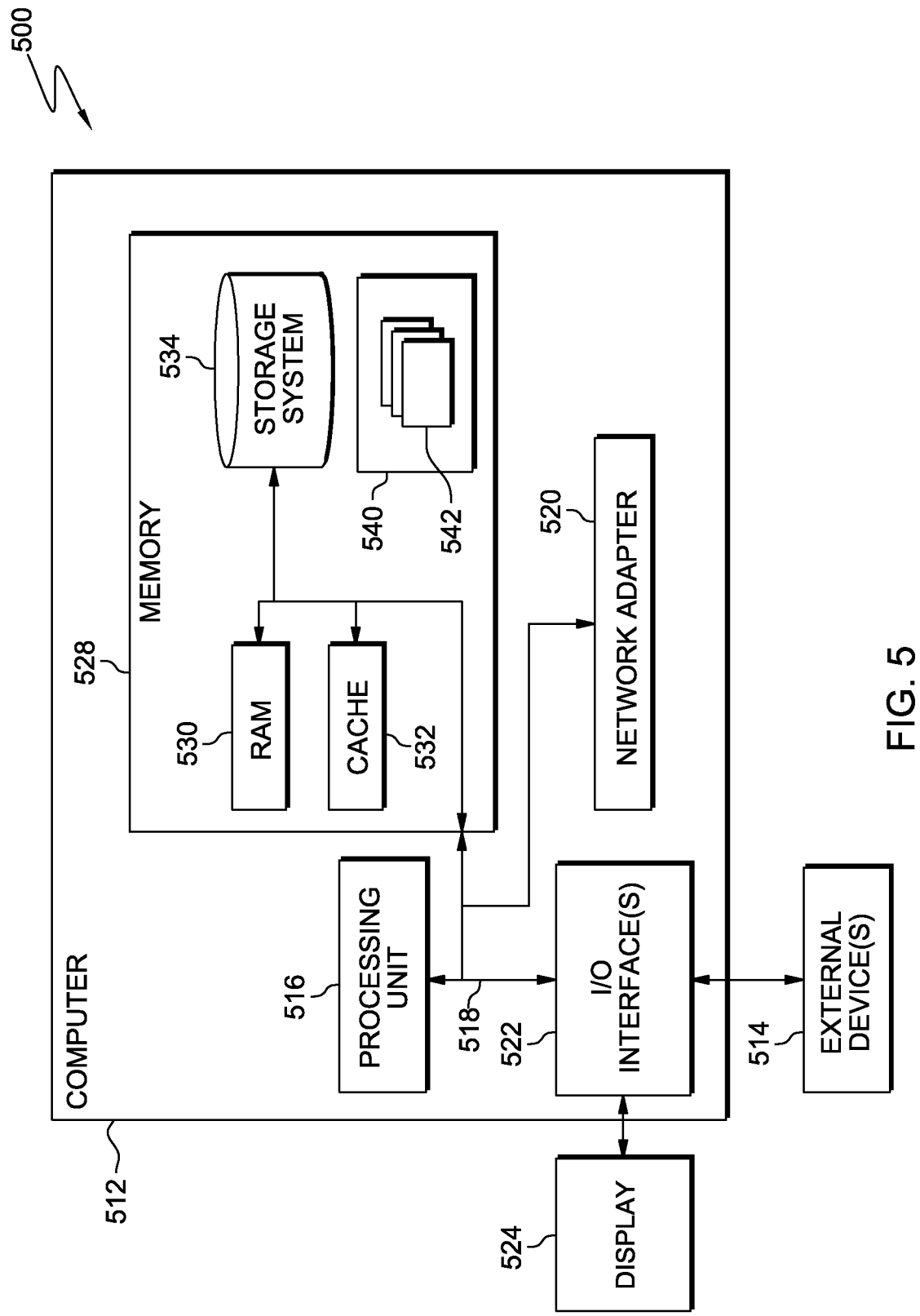
FIG. 5 is a block diagram of a computer system in accordance with an embodiment of the present invention.

Referring now to FIG. 5, a block diagram of a computer system in accordance with an embodiment of the present invention is shown. Computer system 500 is only one example of a suitable computer system and is not intended to suggest any limitation as to the scope of use or functionality of embodiments of the invention described herein. Regardless, computer system 500 is capable of being implemented and/or performing any of the functionality set forth hereinabove.

In computer system 500 there is computer 512, which is operational with numerous other general purpose or special purpose computing system environments or configurations. Examples of well-known computing systems, environments, and/or configurations that may be suitable for use with computer 512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Workflow system 102 can include or can be implemented as an instance of computer 512.

Computer 512 may be described in the general context of computer system executable instructions, such as program modules, being executed by a computer system. Generally, program modules may include routines, programs, objects, components, logic, data structures, and so on that perform particular tasks or implement particular abstract data types. Computer 512 may be practiced in distributed cloud computing environments where tasks are performed by remote processing devices that are linked through a communications network. In a distributed cloud computing environment, program modules may be located in both local and remote computer system storage media including memory storage devices.

As further shown in FIG. 5, computer 512 in computer system 500 is shown in the form of a general-purpose computing device. The components of computer 512 may include, but are not limited to, one or more processors or processing units 516, memory 528, and bus 518 that couples various system components including memory 528 to processing unit 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 512 typically includes a variety of computer system readable media. Such media may be any available media that is accessible by computer 512, and includes both volatile and non-volatile media, and removable and non-removable media.

Memory 528 can include computer system readable media in the form of volatile memory, such as random access memory (RAM) 530 and/or cache 532. Computer 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention. Workflow representation 110 can be stored on memory 528.

Program 540, having one or more program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein. Workflow editor 104, workflow executor 106, and workflow analyzer 108 can be implemented as or can be an instance of program 540.

Computer 512 may also communicate with one or more external devices 514 such as a keyboard, a pointing device, or one or more devices that enable a user to interact with computer 512, such as via display 524 depicting a user interface of workflow system 102; and/or any devices (e.g., network card, modem, etc.) that enable computer 512 to communicate with one or more other computing devices. Such communication can occur via Input/Output (I/O) interfaces 522. Still yet, computer 512 can communicate with one or more networks such as a local area network (LAN), a general wide area network (WAN), and/or a public network (e.g., the Internet) via network adapter 520. As depicted, network adapter 520 communicates with the other components of computer 512 via bus 518. It should be understood that although not shown, other hardware and/or software components could be used in conjunction with computer 512. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor (i.e., a computing processor) of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

What is claimed is:

1. A method for detecting and assisting in the correction of a race condition in a workflow representation, comprising:
    identifying a workflow representation, the workflow representation having been at least one of previously created or previously edited, the workflow representation comprising at least two analytics, the at least two analytics being connected by at least one directed edge, the at least one directed edge representing at least one of workflow or control flow;
    retrieving a first contract for a first analytic of the two or more analytics, wherein the first contract specifies an input type and an output type of the first analytic, and wherein the first contract includes information required to execute the first analytic by a workflow executor;
    retrieving a second contract for a second analytic of the two or more analytics, wherein the second contract specifies an input type and an output type of the second analytic, and wherein the second contract includes information required to execute the second analytic by the workflow executor;
    determining that the output type of the first analytic matches the input type of the second analytic, based on a comparison of the first contract and the second contract; and
    determining that the workflow representation does not include a directed edge connecting the matched output type of the first analytic to the matched input type of the second analytic, thereby causing a race condition, the race condition being correctable by adding a directed edge in the workflow representation connecting the matched output type of the first analytic to the matched input type of the second analytic.

2. The method of claim 1, further comprising recommending adding a directed edge in the workflow representation connecting the matched output type of the first analytic to the matched input type of the second analytic.

3. The method of claim 1, further comprising adding a directed edge in the workflow representation connecting the matched output type of the first analytic to the matched input type of the second analytic.

4. The method of claim 1, further comprising determining that the second analytic is downstream of the first analytic in the workflow representation.

5. The method of claim 3, wherein adding the directed edge in the workflow representation connecting the matched output type of the first analytic to the matched input type of the second analytic constrains, during an execution of the workflow representation by the workflow executor, the first analytic to complete execution before the second analytic begins execution.

6. The method of claim 1, wherein the first analytic is configured to perform a computation on input data of the input type of the first analytic to produce output data of the output type of the first analytic.

7. The method of claim 1, wherein the first analytic is configured to receive input data of the input type of the first analytic at an input pin of the first analytic, and to produce output data of the output type of the first analytic at an output pin of the first analytic.

8. The method of claim 1, wherein the output type of the first analytic is associated with an output pin of the first analytic, and wherein the input type of the second analytic is associated with an input pin of the second analytic.

9. The method of claim 8, further comprising including a directed edge in the workflow representation connecting the output pin of the first analytic to the input pin of the second analytic.

10. A computer program product for detecting and assisting in the correction of a race condition in a workflow representation, comprising a computer readable storage memory having program code embodied therewith, the program code executable by a processor to:
   identify a workflow representation, the workflow representation having been at least one of previously created or previously edited, the workflow representation comprising at least two analytics, the at least two analytics being connected by at least one directed edge, the at least one directed edge representing at least one of workflow or control flow;
   retrieve a first contract for a first analytic of the two or more analytics, wherein the first contract specifies an input type and an output type of the first analytic, and wherein the first contract includes information required to execute the first analytic by a workflow executor;
   retrieve a second contract for a second analytic of the two or more analytics, wherein the second contract specifies an input type and an output type of the second analytic, and wherein the second contract includes information required to execute the second analytic by the workflow executor;
   determine that the output type of the first analytic matches the input type of the second analytic, based on a comparison of the first contract and the second contract; and
   determine that the workflow representation does not include a directed edge connecting the matched output type of the first analytic to the matched input type of the second analytic, thereby causing a race condition, the race condition being correctable by adding a directed edge in the workflow representation connecting the matched output type of the first analytic to the matched input type of the second analytic.

11. The computer program product of claim 10, further comprising program code to recommend adding a directed edge in the workflow representation connecting the matched output type of the first analytic to the matched input type of the second analytic.

12. The computer program product of claim 10, further comprising program code to add a directed edge in the workflow representation connecting the matched output type of the first analytic to the matched input type of the second analytic.

13. The computer program product of claim 10, further comprising program code to determine that the second analytic is downstream of the first analytic in the workflow representation.

14. The computer program product of claim 12, wherein adding the directed edge in the workflow representation connecting the matched output type of the first analytic to the matched input type of the second analytic constrains, during an execution of the workflow representation by the workflow executor, the first analytic to complete execution before the second analytic begins execution.

15. The computer program product of claim 10, wherein the first analytic is configured to perform a computation on input data of the input type of the first analytic to produce output data of the output type of the first analytic.

16. The computer program product of claim 10, wherein the first analytic is configured to receive input data of the input type of the first analytic at an input pin of the first analytic, and to produce output data of the output type of the first analytic at an output pin of the first analytic.

17. The computer program product of claim 10, wherein the output type of the first analytic is associated with an output pin of the first analytic, and wherein the input type of the second analytic is associated with an input pin of the second analytic.

18. A system for detecting and assisting in the correction of a race condition in a workflow representation, comprising:
   one or more processors, one or more computer-readable memories, one or more computer-readable tangible storage devices, and program code stored on at least one of the one or more storage devices for execution by at least one of the one or more processors via at least one of the one or more memories, the program code executable to:
   identify a workflow representation, the workflow representation having been at least one of previously created or previously edited, the workflow representation comprising at least two analytics, the at least two analytics being connected by at least one directed edge, the at least one directed edge representing at least one of workflow or control flow;
   retrieve a first contract for a first analytic of the two or more analytics, wherein the first contract specifies an input type and an output type of the first analytic, and wherein the first contract includes information required to execute the first analytic by a workflow executor;
   retrieve a second contract for a second analytic of the two or more analytics, wherein the second contract specifies an input type and an output type of the second analytic, and wherein the second contract includes information required to execute the second analytic by the workflow executor;
   determine that the output type of the first analytic matches the input type of the second analytic, based on a comparison of the first contract and the second contract; and
   determine that the workflow representation does not include a directed edge connecting the matched output type of the first analytic to the matched input type of the second analytic, thereby causing a race condition, the race condition being correctable by adding a directed edge in the workflow representation connecting the matched output type of the first analytic to the matched input type of the second analytic.

19. The system of claim 18, further comprising program code to determine that the second analytic is downstream of the first analytic in the workflow representation.

20. The system of claim 18, further comprising:
   program code to add a directed edge in the workflow representation connecting the matched output type of the first analytic to the matched input type of the second analytic;

and, wherein:
adding the directed edge in the workflow representation connecting the matched output type of the first analytic to the matched input type of the second analytic constrains, during an execution of the workflow representation by the workflow executor, the first analytic to complete execution before the second analytic begins execution.

* * * * *